March 28, 1933.  C. W. SPICER ET AL  1,902,976
CASING FOR UNIVERSAL JOINTS
Filed April 10, 1929

GURDON LUCIUS TARBOX
CLARENCE WINFRED SPICER
INVENTORS

ATTORNEY

Patented Mar. 28, 1933

1,902,976

UNITED STATES PATENT OFFICE

CLARENCE WINFRED SPICER, OF PLAINFIELD, AND GURDON LUCIUS TARBOX, OF NORTH PLAINFIELD, NEW JERSEY

CASING FOR UNIVERSAL JOINTS

Application filed April 10, 1929. Serial No. 354,087.

Our invention relates to casings constructed after the manner disclosed in United States Patent 958,023 granted to C. W. Spicer, May 17, 1910, and has for its object to provide a means for preventing the lubricant from entering between the outside and inside casing from where it may be freed by centrifugal force under the packing. In our long study of this question in connection with the manufacture of universal joints we have found that any means of packing the casings on the outside of the inside casing as shown in the patent before referred to will not prevent the lubricant from running in between the casings and thereafter immediately being forced out under the packing by centrifugal action. Many schemes have been advanced to overcome this leakage and many patents have issued showing various means of packing the space between two part casings. We have discovered that if a casing made of substantially non-yielding material but flexible at its mouth due to its structure is placed inside the inside casing adapted to snugly fit the sleeve of the joint and a bell shaped mouth the extreme edge of which contacting with the inside of the inside casing at an angle to the tangent at point of contact the lubricant film will be cut and the lubricant wiped off the casing and all the lubricant will be retained within the inside casing.

The angle which the bell mouth makes with the tangent of the outer casing at the point of contact throughout its movement is an important part of this invention. Another important feature is if the contact with the outer casing covers a wide area the lubricant will be wiped out of the casing, but if this area is small approaching a knife edge, the lubricant remains within the casing.

The use of this innermost casing baffle will not necessarily do away with the old outside casing which may be retained merely as a dust cap to prevent dirt from entering the joint and probably destroying the semi-flexible casing inside.

The foregoing and other features of our invention will now be described in connection with the accompanying drawing forming part of this disclosure in which we have represented our casing in its preferred form, after which we shall point out more particularly in the claims those features which we believe to be new and of our joint invention.

In the drawing accompanying and forming part of this specification:

Figure 1:
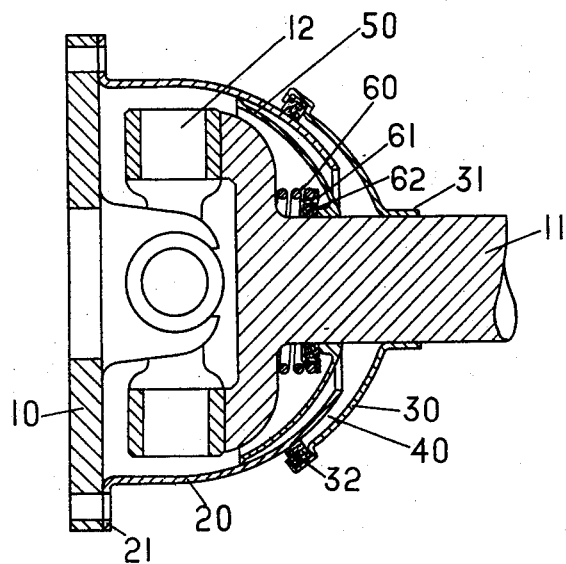
Figure 1 is a longitudinal section of a universal joint embodying our invention.

In Figure 1 we have illustrated a standard universal joint comprising a driving member 10, a driven member 11 connected together for universal movement through the journal 12. The joint is normally encased by a two part casing of which 20 is the inner casing and 30 the outer casing. The inner casing 20 as shown is provided with a flange 21 for convenience in attaching to the driving member 10 and the outer casing is provided with a sleeve 31 for mounting on the driven member 11.

The outer casing is provided with a packing 32 which rides on the outside surface of the inner casing 20.

The description so far is common to the universal joint disclosed in the United States patent heretofore specifically mentioned by number and date.

With the above construction, any lubricant working into the space 40 between the inner and outer casing will be forced under the packing 32 by the action of centrifugal force.

Figure 2:
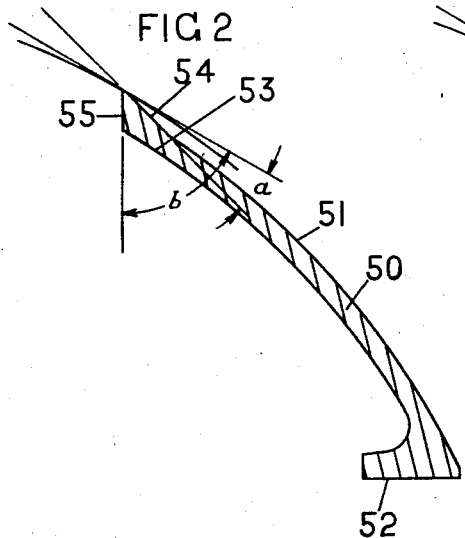
Figure 2 is an enlarged section of our casing.

On the inside of the inside casing 20 we provide a third casing 50 preferably made of semi-flexible material and formed as shown in Figure 2 having a wall surface 51, a tubular extension or flange 52 a bell shaped mouth 53 the outside surface 54 making an acute angle $a$ with the tangent at point of contact with the inner casing 20.

The inside surface 55 makes an acute angle with the outside surface 54 as shown. With this construction the wedge shaped bell mouth is kept in contact with the inside of the inside casing 20 by the spring 60. Interposed between the spring 60 and the casing 50 we provide an annular collar 61 of Z section and a packing 62. The casing 50 which is substantially of non-yielding material is sufficiently pliable to make complete contact with the inner side of the inside casing and at the same time scrape the lubricant off the wall thereby retaining the lubricant in the joint.

Figure 3:
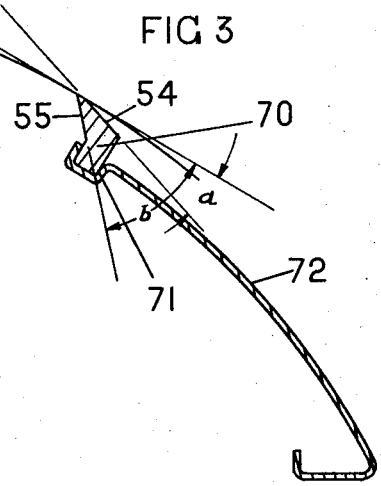
Figure 3 shows an enlarged modification which we may employ.

We do not wish to limit ourselves to a formed casing as shown in detail in Figure 2 but we may carry out our ideas by having the formed part a ring 70 supported in a groove 71 in a metal casing 72 as shown in Figure 3.

In the claims we have used the term "bell shaped mouth" as applied to the opening of the inside casing or baffle by which we mean that the bell shape casing increases in diameter to point of contact with the outer casing.

We wish it distinctly understood that our incased universal joint herein described and illustrated is in the form in which we desire to construct it but that changes or variations may be made as may be convenient or desirable without departing from the salient features of my invention and we therefore intend the following claims to cover such modifications as naturally fall within the lines of invention.

We claim:

1. A casing for a universal joint comprising an inner and outer casing, the latter being partly spherical, the inner casing provided with a bell shaped mouth, the extreme edge thereof adapted to ride on the inside surface of the partly spherical casing, said bell shaped mouth set at a permanent acute angle to the tangent at the point of contact with the casing and contacting only through its edge with the inside of the partly spherical casing.

2. The device of claim 1 with the addition that the bell shaped mouth has a wedge shaped section.

3. The combination of a casing consisting of two casings of which one overlaps the other; a third casing provided with a bell shaped mouth adapted to be pressed against the inside of the inner casing, said bell shaped mouth having a wedge shaped section both sides of which form permanent acute angles with the tangent to the casing at point of contact.

4. In a two part casing for a universal joint, comprising an inner and outer casing, the inner casing having a bell-shaped mouth only the edge of which rides on the inside of the outer casing.

5. A casing for a universal joint having shaft members consisting of three concentric cup-shaped members the intermediate one being partly spherical and all mounted for universal movement on the shaft members; an innermost casing mounted on a joint shaft member and its wall kept at substantial distance from the inside of the partial spherical intermediate casing; the mouth of the innermost casing being of circular form and having a sharp edged outwardly slanting portion, contacting with the inside of the adjacent cup at a permanently acute angle to the tangent at point of contact.

6. A casing for a universal joint comprising two cups enclosing independent driving and driven members of a universal joint, the innermost cup provided with a bell-shaped mouth of such a contour that only the edge thereof contacts with the outside cup thereby forming clearance between the cups except for the circular line of contact.

7. A casing for a universal joint comprising a plurality of cups mounted for universal movement on shaft members, the innermost cup being of substantially non-yielding material but flexible due to its structure and having a mouth only the extreme edge thereof contacting with the adjacent cup, said contact being completed by independent spring pressure.

In testimony whereof we have affixed our signatures.

CLARENCE WINFRED SPICER.
GURDON LUCIUS TARBOX.